United States Patent
Ashibe (10) Patent No.: US 8,007,186 B2
(45) Date of Patent: Aug. 30, 2011

(54) METHOD OF CONSTRUCTING A NORMAL JOINT STRUCTURE OF A SUPERCONDUCTING CABLE

(75) Inventor: Yuuichi Ashibe, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 403 days.

(21) Appl. No.: 11/794,800

(22) PCT Filed: Aug. 8, 2006

(86) PCT No.: PCT/JP2006/315650
§ 371 (c)(1),
(2), (4) Date: Jul. 6, 2007

(87) PCT Pub. No.: WO2007/034631
PCT Pub. Date: Mar. 29, 2007

(65) Prior Publication Data
US 2010/0021113 A1    Jan. 28, 2010

(30) Foreign Application Priority Data
Sep. 22, 2005   (JP) ................... 2005-276829

(51) Int. Cl.
*G02B 6/255* (2006.01)
(52) U.S. Cl. .............. 385/95; 385/96; 385/101
(58) Field of Classification Search ......... 385/95–101
See application file for complete search history.

(56) References Cited

U.S. PATENT DOCUMENTS

| 4,830,457 A | 5/1989 | Asada et al. |
| 2006/0193575 A1* | 8/2006 | Greenwood et al. ......... 385/109 |

FOREIGN PATENT DOCUMENTS

| CN | 2691021 Y | 4/2005 |
| JP | 60-9011 | 1/1985 |
| JP | 02-239605 | 9/1990 |
| JP | 03-101010 | 4/1991 |
| JP | 03114011 | * 5/1991 |
| JP | 2003114011 A | * 5/1991 |
| JP | 06-109939 | 4/1994 |
| JP | 06-242325 | 9/1994 |
| JP | 2000-340274 | 12/2000 |

* cited by examiner

*Primary Examiner* — Ellen Kim
(74) *Attorney, Agent, or Firm* — Drinker Biddle & Reath LLP (57) ABSTRACT

Provided is a method of constructing a normal joint structure for connecting superconducting cables having a cable core and an optical fiber arranged along the cable core. With the method, which includes the steps of: pulling out an optical fiber from the end of each of two superconducting cables to be connected together and splicing the optical fibers thus pulled out; returning the excess length of the pulled-out optical fiber to a superconducting cable side upon the completion of splicing; and connecting the cable cores, it is possible to reduce the quantity of optical fiber housed in a joint box, and accordingly to downsize the joint box.

4 Claims, 8 Drawing Sheets

METHOD OF CONSTRUCTING A NORMAL JOINT STRUCTURE OF A SUPERCONDUCTING CABLE

TECHNICAL FIELD

The present invention relates to a method of constructing a normal joint structure for connecting superconducting cables together. Particularly, the invention relates to a method of constructing a small normal joint structure of a superconducting cable.

BACKGROUND ART

In the past, using a superconducting cable as an electric power cable for an electric power supply line has been studied. In a typical structure of a superconducting cable, a cable core having a superconductor is housed in a thermal insulation pipe and the superconductor is maintained in a superconducting state by cooling with a coolant filled in the thermal insulation pipe. In recent years, a multicore cable having a plurality of cores housed in a thermal insulation pipe, as well as a single-core cable having one cable core housed in a thermal insulation pipe, has been developed.

The above-mentioned superconducting cable is limited in terms of the cable length, depending on manufacturing, transportation, installation, and other conditions. Therefore, in order to construct an electric power supply line over a long distance using superconducting cables, it is necessary to provide intermediate connections for connecting the cables along the line. For example, a normal joint structure for a three-core superconducting cable is disclosed in Patent document 1. The disclosed normal joint structure is structured such that the three cores pulled out from the end of one of two superconducting cables to be connected are joined with the corresponding three cores pulled out from the end of the other superconducting cable, respectively, and the ends of the cores and the coupled parts of these cores are housed altogether in the same joint box.

After the construction of the line, a coolant is introduced into the thermal insulation pipes of the superconducting cables and the above-mentioned joint boxes. If rapid cooling is performed in the initial stages of the cooling, cable components might be damaged by the steep temperature variation. Therefore, generally the cooling is performed gradually, while observing the temperature over the full length of the cable including the above-mentioned coupled parts of the cable cores, so as to cause the temperature to change in a degree that may not have an influence on the performance of the cable components. Then, the operation of the line is commenced after it has been confirmed that the cable cores, the coupled parts of the cable cores, etc. are sufficiently cooled. It is considered to arrange temperature sensors using an optical fiber along the cable cores in order to observe temperatures along the full length of the superconducting cable (See Non-patent document 1).

When a normal joint structure is formed in a superconducting cable in which a temperature sensor using an optical fiber is arranged, it is necessary to splice optical fibers in addition to splicing cable cores. A fusion splicer is generally used for splicing optical fibers. Therefore, in order to connect optical fibers in the case of forming a normal joint structure, the splicing work is performed, pulling out an optical fiber from the end of the respective superconducting cable so that the end of each optical fiber may be arranged in the space where it is possible to place a fusion splicer. The excess length of the optical fibers thus pulled out and the spliced parts of the optical fibers as well as the coupled parts of the cable cores are housed in a joint box.

[Patent document 1] Japanese Patent Application Publication No. 2000-340274 (FIG. 1)

[Non-patent document 1] SUPERCONDUCTIVITY COMMUNICATIONS, Vol. 11, No. 1, February 2002, Title: Test results of a high temperature superconducting cable are partly published. Kishio Laboratory, Department of Superconductivity, School of Engineering, The University of Tokyo.

[Searched on Jun. 22, 2005] The Internet URL <http://www.chem.t.u-tokyo.ac.jp/appchem/labs/kitazawa/SUPERCOM>

DISCLOSURE OF THE INVENTION

Problem to be Solved by the Invention

However, the shortcoming of the conventional normal joint structure is that the size inevitably becomes too large. After the fusion-splicing of optical fibers, as described above, the spliced part and the whole excess length of the optical fibers pulled out from the superconducting cable are housed in the joint box. In this case, the allowable bend radius R of an optical fiber is comparatively large: for example, R of an optical fiber having a diameter of about 1 mm is about 100 mm. If the bend exceeding the allowable bend radius R is applied to the optical fiber, the transmission loss will increase, resulting in a failure of proper measurement and transmission. Thus, if the excess length having been pulled out in a state satisfying the allowable bend radius R is housed in a joint box, the consequential drawback is that the size of the splice structure (the joint box), particularly the outer diameter, increases accordingly. In the case where the coupled parts of cable cores are formed earlier, the excess length of the optical fibers might be wound around the outer periphery of the coupled parts of the cores, for example. In this case, however, it cannot help designing the joint box to have a large outer diameter to some extent. Depending on the installation site of the joint box, the available space might be limited, and accordingly it might be impossible to install the joint box at the site (e.g., an existing manhole) if the splice structure is large-sized. Therefore, the enlargement of the splice structure is undesirable.

The main object of the present invention is to provide a method of constructing a normal joint structure of a superconducting cable, in which method the normal joint structure of the superconducting cable having an optical fiber along the cable cores can be made small-sized without enlarging the size excessively.

Means for Solving the Problem to be Solved

The present invention achieves the above object in a manner such that the optical fiber which has been pulled out from a superconducting cable is returned to the superconducting cable side upon the completion of splicing. The invention is characterized in that the method of constructing a normal joint structure for connecting superconducting cables each having a cable core and an optical fiber arranged along the cable core includes the following 1 to 3 steps:

1. A step of pulling out an optical fiber from the end of each of two superconducting cables to be connected together and splicing the optical fibers thus pulled out;

2. A step of returning the excess length of the pulled-out optical fiber to a superconducting cable side upon the completion of splicing; and 3. A step of connecting the cable cores.

Hereinafter, the present invention will be described in detail.

First, the composition of a superconducting cable to be used in the implementation of the present invention will be described. The superconducting cable to be used for implementing the present invention is a superconducting cable which has a cable core including a superconductor, and typically the superconducting cable is equipped with a thermal insulation pipe the inside of which is filled with a coolant for housing the cable core. The basic composition of the cable core is structured such that the outer periphery of a superconductor is covered with an electrical insulation layer. Other constituent members of the cable core are, for example, a former which is provided inside the superconductor, an outer superconductive layer which is different from the superconductor and provided outside the electrical insulation layer, and a protective layer which is provided around the outer periphery of the outer superconductive layer. Moreover, the cable core may be equipped with an inner semiconductive layer provided between the superconductor and the electrical insulation layer, and an outer semiconductive layer provided between the electrical insulation layer and the outer superconductive layer.

The former, which functions as a means for maintaining a given shape of a superconductive conductor, may be solid or hollow, and may have a pipe-like structure or a stranded-wire structure. The preferable material of the former is, for example, a metal which is a nonmagnetic metallic material and which exhibits low resistance at about the coolant temperature, such as copper, copper alloy, aluminum, or aluminum alloy. If a cushion layer made of insulation paper or carbon paper, or the like is interposed between the former and the superconductive conductor, a direct contact can be avoided between the former and a superconducting wire (described later) which comprises a superconductive conductor, and consequently the superconducting wire can be prevented from being damaged by the direct contact. In addition, it has a function of smoothing the surface of the former to be more flat. The superconductive conductor and the outer superconductive layer can be formed, for example, by spirally winding a wire consisting of Bi2223 based oxide superconducting material around the former and the electrical insulation layer, respectively. The winding of the superconducting wire may be made in a single layer or multiple layers. In the case of multiple layer winding, an inter-level isolation layer may be provided. For example, the inter-level isolation layer may be composed of an insulation paper such as kraft paper or a semisynthetic insulating paper such as PPLP (a registered trademark of Sumitomo Electric Industries, Ltd.) which is made of polypropylene and kraft paper. The electrical insulation layer is formed by winding an insulation material, for example, an insulation paper such as kraft paper, or a semisynthetic paper such as PPLP (the registered trademark), around the outer periphery of the superconductive conductor. The outer superconductive layer functions as a shielding layer for restraining the leaking-out of the magnetic field of the alternating current flowing through the superconductive conductor when the superconducting cable is used for an alternating current power transmission. When the superconducting cable is used for a direct current power transmission, the outer superconductive layer can be used as a return-current conductor or a neutral superconducting conductor. The protective layer, which mainly functions as a means for mechanical protection of the outer superconductive layer, is formed by winding an insulation paper such as kraft paper around the outer superconductive layer.

The thermal insulation pipe for housing the above-mentioned cable core has, for example, a vacuum thermal insulation structure in which the space between the double pipes consisting of an outer pipe and inner pipe is evacuated. In addition to the evacuation, a thermal insulation material may be arranged in the space between the double pipes. Preferably, the evacuation should be done beforehand at a factory, or the like. The evacuation work at the installation site can be reduced if the thermal insulation pipe is structured such that a vacuum layer provided beforehand with a predetermined vacuum level will not be destroyed at the time of constructing a coupled part of cable cores. A coolant such as liquid-nitrogen is filled in the inner pipe in order to cool the superconductive conductor and the outer superconductive layer. A preferable example of such a thermal insulation pipe is a flexible corrugated pipe.

The present invention uses a superconducting cable in which one or more lengths of the above-mentioned cable cores are housed in the thermal insulation pipe. For example, the superconducting cable may be a single core superconducting cable in which a single cable core is housed in a thermal insulation pipe, or may be a multicore superconducting cable in which two or more cores twisted together are housed in a thermal insulation pipe. The multicore cable has, for example, a structure in which three cable cores twisted together are put in one thermal insulation pipe. In the case of a multicore cable, if cable cores are twisted together with flexure, the flexure can be used as an allowance for thermal contraction.

Particularly, the present invention relates to a superconducting cable in which the above-mentioned cable cores and an optical fiber arranged along the cable cores are housed in a thermal insulation pipe. The optical fiber may be used in a form of an optical fiber strand having a minimum protective cover or in a form of an optical fiber core wire having a secondary coating. In the case of the optical fiber core wire, it may, for example, be in a form of a single-core wire, or a tape-shaped wire in which a plurality of optical fibers are arranged side by side and covered altogether with a covering layer, or the like. Moreover, if an optical fiber is used in a form such that a covering layer consisting of a high strength material is provided around the outer periphery of the optical fiber strand or the optical fiber core wire, the optical fiber can be more securely protected and it is possible to prevent the optical fiber from being damaged in a pull-in or push-in operation as described later. The high strength material to be used is, for example, a metallic material such as stainless steel, etc. Also, the covering layer consisting of a high strength material preferably has flexibility: for example, a thin pipe made of the above-mentioned material may be used. For example, when a stainless pipe is used as the covering layer made of high strength material, the thickness thereof is about 0.1 to 0.3 mm. In this case, the space provided between the inner circumference of the thin pipe and the outer periphery of an optical fiber (strand or core wire) is preferably filled with a resin or the like so that the optical fiber and the pipe are united beforehand. If the space is sufficiently small so as not to cause the optical fiber to slip off from the thin pipe, it is unnecessary to fill the resin or the like. The optical fiber to be put in the thin pipe may be in a form of either single core or multicore. The size of the thin pipe may appropriately be chosen according to the number of optical fibers to be housed therein. Also, the optical fiber may be used in a form of an optical fiber cable having the above-mentioned optical fiber core wire. The optical fiber cable may, for example, have a structure in which a spacer having a groove provided on the outer peripheral side thereof for housing the optical fiber core wire and a protective layer covering the outer periphery of the spacer are included. The spacer is equipped with a tension member at the central part thereof.

By arranging the above-mentioned optical fiber along the cable core, it is made possible to use the fiber for monitoring the conditions of the core. For example, the optical fiber can be used for measuring the temperature of the cable core and the longitudinal temperature distribution along the core. More specifically, if a temperature detecting instrument having a laser beam source is connected at an end of the optical fiber and a laser beam of pulse shape is made incident on one end or both ends of the optical fiber so that the intensity of Raman back-scattered light is measured, it is possible to measure a temperature near the outer periphery of the optical fiber, that is, the temperature of the cable core, since the intensity of the scattered light depends on temperature. Also, it is possible to determine the position of occurrence of scattered light by measuring the return time needed between the time when the laser beam is made incident on the optical fiber and the time when the scattered light is detected. That is, the temperature of each position of the cable core can be detected. Therefore, if quenching is caused by an accident, for example, at a point of a cable core in operation, resulting in an increase of the temperature, it is possible to determine the location of the accident by detecting the temperature and the position thereof. In this manner, the optical fiber can be used as a sensor for detecting the position of an accident. Also, it is possible to obtain temperature distribution along the cable core since the temperature of each point of the cable core can be measure by using an optical fiber as described above. Therefore, the temperature distribution in the longitudinal direction of the cable core can be obtained, for example, in the early stages of introducing a coolant after the construction of the line. That is, the optical fiber can be used as a sensor for detecting the temperature distribution. Or, the optical fiber can, of course, be used as a communication line as well. It is possible to use a plurality of such optical fibers for different usages.

In order to arrange the above-mentioned optical fiber along a cable core, the optical fiber may be wound spirally around the outer periphery of the core, for example. In such case, the winding diameter should be set within the range of allowable bend of the optical fiber. In the case where a superconducting cable is a multicore cable having a structure in which cable cores are twisted together with flexure so as to have a gap (a space surrounded by the cores) in the central part of the twisted cores, the optical fiber may be inserted into the gap. Or, the twisting together of the cable cores may be done in a manner such that an optical fiber is supplied to the core twisting device so as to be arranged at the above-mentioned gap during twisting together of the cable cores.

As described above, the optical fiber may be arranged along the cable core by winding around the outer periphery of a cable core, or by inserting in a gap among the cores, simply in a state as it is, that is, in any of the following forms: a strand, a core wire, a strand or core wire having a covering layer made of a high strength material, and an optical fiber cable. However, in such case, the optical fiber might be damaged. Also, with the above-mentioned arrangement of the optical fiber as it is, the frictional resistance tends to be large in the case of pulling out the optical fiber for splicing or in the case of returning the optical fiber after the completion of splicing as described later, or in the case of performing the insertion arrangement of the optical fiber in the gap among cores as mentioned above. Therefore, in consideration of the protection of the optical fiber and the reduction of the frictional resistance, it is preferable to arrange a tubular member along the cable core and to house the optical fiber in the tubular member. In such case, the optical fiber may be put and arranged in the tubular member beforehand, and the tubular member thus containing the optical fiber may be arranged along the cable core. Or, the optical fiber may be inserted and arranged in the tubular member which has previously been arranged along the cable core. In the case of the structure where the cable cores are twisted together with flexure and the tubular member is to be arranged in the gap provided in the central part of the twisted cores, the tubular member may be inserted into the gap thus formed among the cores so that the tubular member may be arranged therein. Or, at the time of twisting plurality of cable cores together, the tubular member may be arranged in the center of the cable cores to be twisted such that the cores are twisted around the outer periphery of the tubular member. Preferably, the tubular member has tolerance about the temperature of the coolant being used and has flexibility for thermal contraction. For example, the tubular member may be a corrugated pipe, or a mesh pipe, which is made of a metallic material such as stainless steel, copper, aluminum, or an alloy which includes these metals, or it may be a tube made of silicone. The size (caliber) of the tubular member may appropriately be chosen so that a desired number of optical fibers can be housed. For example, it is possible to push in and store the excess length of an optical fiber in the tubular member upon splicing the optical fiber as described later if the caliber of the tubular member is made comparatively large so that the clearance between the internal circumference of the tubular member and the outer periphery of the optical fiber may be sufficiently large. Also, in the case where the above-mentioned optical fiber having a covering layer made of high strength material is housed in the tubular member, the optical fiber can be more securely prevented from being damaged, since a double protection structure can be achieved with the covering layer and the tubular member. In the case where an optical fiber is used for the measurement of temperature, or the detection of an accident point, etc., it is preferable that the tubular member be designed to have a structure such that the optical fiber housed therein can be in contact with the coolant filled inside the tubular member. For example, in the tubular member, a through hole may appropriately be provided beforehand piercing from outside to inside through the wall thereof so that when a coolant is introduced into the thermal insulation pipe, the coolant can flow into the inside of the tubular member through the through hole. When a mesh pipe is used as the tubular member, the coolant can flow in through reticulation openings. When an optical fiber is used in a form of an optical fiber cable, it is unnecessary to house the optical fiber in a tubular member since the protection of the optical fiber and the reduction of the frictional resistance can be achieved by means of a spacer, a protective layer, etc.; however, it may be structured so as to be housed in the tubular member.

The above-mentioned optical fiber should be designed to have at least a sufficient excess length (splice excess length) needed for splicing optical fibers in addition to the length corresponding to the cable length of the superconducting cable. Besides, in a case where optical fibers are to be connected together, the optical fibers may be those having a sufficient length necessary for the excess length (pull-out excess length) to be drawn out of the superconducting cable. Or, the optical fibers are not required to have a pull-out excess length in the case where the structure is such that a necessary length can be pulled out at the time of splicing: for example, a structure in which an optical fiber is stored in a tubular member having a low friction as mentioned above. Generally, the splicing of optical fibers is performed at both ends of a superconducting cable, and therefore in the case where an optical fiber has a pull-out excess length, the pull-out excess length of the optical fiber may be, for example, about 2000 mm for the case of splicing at one end, or may be about 2000 mm×2=about 4000 mm for the case of splicing at both ends of the cable. Thus, when the optical fiber has a pull-out excess length, the length of the optical fiber becomes longer by the pull-out excess length than the length of a cable core (in the twisted condition in the case of stranded structure). Therefore, it is necessary to store the pull-out excess length of the optical fiber in the thermal insulation pipe of the superconducting cable beforehand. The part for housing the pull-out excess length can be a part optionally selected in the longitudinal direction of the superconducting cable. Particularly, if the housing part of the pull-out excess length is designed to be near the end of the superconducting cable, that is, if the superconducting cable is structured such that the pull-out excess length is disposed beforehand at the end of the cable, it is possible to draw out the pull-out excess length in a short time, resulting in a satisfactory workability, when optical fibers are connected. For storing the pull-out excess length of an optical fiber in the thermal insulation pipe of the superconducting cable, it may be wound around the outer periphery of the cable core in an allowable bend radius of the optical fiber, or it may be rolled up in a coil form in the range of the allowable bend radius and disposed in the thermal insulation pipe. In both of the above-mentioned cases, when the structure is such that the optical fiber is housed in a tubular member, the pull-out excess length may be left in an exposed state without being stored in the tubular member. Or, when the structure is such that the optical fiber is housed in a tubular member, the pull-out excess length may be stored in the tubular member by putting the optical fiber in a manner meandering by the pull-out excess length. That is, the pull-out excess length may also be housed in the tubular member. In such case, the tubular member should appropriately be designed to have a sufficient caliber size needed for the space of housing the pull-out excess length.

In order to connect superconducting cables, in which an optical fiber is arranged along the cable cores of each cable as described above, after the installation thereof at a predetermined installation site such as a duct, the connection work is performed in two steps: I) the splice of optical fibers and II) the connection of the cores. Either one of the two steps may be performed prior to the other; however, generally the connection of the cable cores is performed earlier. Therefore, the connection of the cable core will be described first. Prior to the connection step, the thermal insulation pipe, which is cut beforehand in a predetermined length at the end of the superconducting cable, is held in a state exposing the end of the cable core from the thermal insulation pipe. In such case, preferably the thermal insulation pipe is designed to have a structure in which the vacuum layer of the thermal insulation pipe will not be destroyed by cutting, and hence it is unnecessary to evacuate the thermal insulation pipe once again. When the superconducting cable is a multicore cable, the interval between the cable cores may be expanded beforehand by untwisting at the exposed end of the cores so that the joint structure of the cores can be easily formed.

The connection of the cable cores is performed, for example, as follows. A coupled part of a conductor is formed by peeling off, step by step, the end of each cable core which is exposed from the end of the thermal insulation pipe as described above, so that a superconductive conductor and a former are exposed, and by performing the respective connections of the formers and the superconductive conductors with a connecting sleeve. Subsequently, an electrical insulation layer consisting of an insulation material such as epoxy resin is provided around the outer periphery of the coupled part of the conductors. Also, a reinforcement electrical insulation layer may be provided by winding an insulation material such as insulation paper, e.g., kraft paper, or a synthetic insulation paper such as PPLP (registered trademark), etc. around the outer periphery of the coupled part of conductors and the outer periphery of the end of the cable core. In addition, a shielding layer and a ground potential layer may be provided around the outer periphery of the reinforcement electrical insulation layer. When the connection of the cable cores are performed prior to the splice of the optical fibers, preferably the optical fibers should be covered with a covering material, or removed to a place which may not hinder the connecting work, so that the optical fibers may not be damaged during the connecting work. Particularly, when the optical fiber has a pull-out excess length, it is preferable to perform the above protective measures against damage because it might easily be damaged during the connection work of the cable cores. The pull-out excess length of an optical fiber is comparatively long, generally about 2000 mm. Therefore, when the pull-out excess length of the optical fiber is provided at the end of the superconducting cable, the optical fiber might be damaged or broken as a result of the pull-out excess length being hitched or touched by a worker, a member forming the coupled part, a tool being used, or the like, during the connection works of the cable cores. Therefore, it is effective to perform the above damage protection measure.

Next, the splice of optical fibers will be described. When optical fibers are to be connected together, each optical fiber is pulled out from the end of the two superconducting cables to be connected. The pulling-out is done so that the ends of the optical fibers to be spliced together may be positioned at a place where a fusion splicer can be placed for performing the splice of the optical fibers. In such case, if the pull-out excess length of the optical fiber is provided at the end of the superconducting cable, the optical fiber can be easily pulled out, and the pull-out work can be accomplished in a short time. Likewise, in the case where an optical fiber is housed in a tubular member, it is easy to pull out the optical fiber even if it does not have the pull-out excess length, because the frictional resistance at the time of pulling-out the optical fiber is small. The above pulling-out should be performed with a force within the range of the permissible tension so that an excessive pulling force such as to break the optical fiber may not be applied. If the optical fiber is provided with a cover for performing the connection work of the cable cores as mentioned above, the above pull-out work should be done after removing the cover.

Subsequently, the optical fibers thus pulled out are spliced together. The splice is performed using the above fusion splicer, or the like. The spliced part of the optical fibers may appropriately be formed in the same procedures as in the case of splicing usual optical fibers. The most typical feature of the present invention is that, after the spliced part of the optical fibers is formed, the excess length of each optical fiber pulled out for splicing is returned to the superconducting cable side from which the optical fiber has been pulled out. In order to return the excess length of the optical fiber to the superconducting cable side, if the fiber end opposite to the end at which the spliced part of the optical fiber has been formed in the cable is open (hereinafter called the "open end"), for example, the optical fiber may be pulled from the open end. In the case where an optical fiber is pulled from the open end of the superconducting cable, such pulling should be performed with a force within the range of the permissible tension of the optical fiber as in the above pull-out work. Particularly, if an optical fiber is housed in the tubular member, the frictional resistance during the pulling operation can be made smaller. If an optical fiber having a covering layer made of a high strength material is used, it is possible to prevent an occurrence of defect such as fiber breakage because it has excellent strength. The above pulling operation may be performed by pulling the excess length (pull-out excess length) of the spliced two optical fibers from the open end of either one of the connected two superconducting cables, or by pulling the excess length of each optical fiber from the open end of the respective cable. That is, the excess length of the optical fiber is not always returned to the same cable from which it has been pulled out. In the case where the excess length of the optical fiber is pulled from the open end of either one of the two superconducting cables, satisfactory workability can be achieved if it is pulled from the open end of the relatively shorter one of the superconducting cables or from the open end of the cable located on the side where apparently the friction is relatively smaller in the case of existence of up-and-down differences depending on the installation mode of the cables, for example, because the time needed for the pull-in can be reduced or the pull-in work can be performed easily. Thus, the optical fiber which has been pulled out from a superconducting cable can be pulled into the cable side by pulling from the open end of the superconducting cable. The excess length drawn out from the open end of the superconducting cable may be used for forming the spliced part of the optical fiber on the side of the open end, or the unnecessary part thereof may be cut. After an optical fiber splicing is completed on the open end side, the excess length of the optical fiber may be pulled from the open end side of the other connected superconducting cable in the same manner.

Besides the method in which the excess length of optical fiber is returned to the cable side by pulling from the open end of the superconducting cable upon completion of the splice of optical fibers as described above, there is a method in which, for example, the excess length of the optical fiber is pushed into the superconducting cable side. For example, the excess length of the optical fiber may be pushed into the space in the thermal insulation pipe (inside the inner pipe), or in the case of an optical fiber being housed in the tubular member, it may be pushed into the inside of the tubular member. In the latter case, the inner diameter of the tubular member should be selected so as to have a size suitable for housing the excess length. The optical fiber excess length which has been pushed into the tubular member is housed in a meandering state in the tubular member. The optical fiber thus pushed into the tubular member may be fixed with a tape or the like to the end of the tubular member so that the optical fiber may not come out of the tubular member.

If the connection of the cable cores is performed after the excess length of the optical fiber is returned to the superconducting cable side by pulling or pushing-in upon formation of the spliced part of optical fibers, it is possible to prevent the optical fiber from being damaged, since almost nothing touches the excess length inadvertently during the work for connecting the cable cores.

As described above, upon completing the splice of the optical fibers and the connection of the cable cores, the connected parts are stored in a joint box. In such case, according to the present invention, since the excess length of the optical fiber is returned to the superconducting cable side as described above, the optical fiber does not protrude excessively from the end of the superconducting cable. That is, the quantity of the optical fiber stored in the joint box is less as compared with the conventional method. Therefore, according to the present invention, it is possible to avoid enlargement of a joint box, particularly, the enlargement of the outer diameter thereof. The joint box may be made of a dual structure, for example, comprising a coolant vessel, in which a coolant such as liquid-nitrogen for cooling a superconductive conductor and a coupled part of conductors is filled, and a thermal insulation vessel, which is provided in a manner covering the outer periphery of the coolant vessel. Particularly, it is preferable to design the joint box to be structured such that the separable fragmentary parts divided in the longitudinal direction of a cable core can be combined together to form an integral unit, since the structure allows the connection work to be performed easily in a limited space such as a manhole. When the splice of optical fibers and the connection of cable cores are to be done, the divided fragmentary parts of the joint box may be removed beforehand on the superconducting cable side so that the end of the optical fiber and the end of the core may be exposed, and after the connection work of the optical fibers and the cable cores is ended, the removed fragmentary parts may be moved and be connected together by welding the edges of the fragmentary parts or other methods so that they may be integrated into a joint box. After the joint box is formed, the space between the coolant vessel and the thermal insulation vessel may be evacuated so that a thermal insulation function may be afforded to the thermal insulation vessel. A joint box equipped with a vacuum layer may be used. In addition to the evacuation, a thermal insulation material such as super insulation (trade name) or the like may be arranged between the coolant vessel and the thermal insulation vessel.

A normal joint structure of a superconducting cable is built by the above-described steps. In addition to the normal joint structure, a terminal joint structure which is to be connected with equipment of the normal temperature side is separately formed, and thereby a superconducting cable line is constructed. The operation of the superconducting cable line is commenced after the cable cores and the coupled part of conductors are sufficiently cooled by filling a coolant appropriately into the thermal insulation pipe of the cable and the joint box. In such case, if the superconducting cable is equipped with an optical fiber for temperature measurement, it is possible to confirm the cooling condition by measuring the temperature of the cable cores using the optical fiber.

Advantageous Effect of the Invention

According to the construction method of the present invention, since the optical fiber excess length which has been pulled out for splicing is returned to the superconducting cable side after the optical fibers have been spliced, it is possible to decrease the quantity of optical fiber which is stored in a joint box. Therefore, by using the construction method of the present invention, it is unnecessary to enlarge the size of a joint box, and accordingly excessive enlargement of a normal joint structure can be avoided. Therefore, the normal joint structure can be constructed sufficiently at an installation place where the space for the installation of the joint box is comparatively small. Besides, in the case of forming a coupled part of cable cores, if the joint structure of cable cores is formed after the excess length of optical fiber is returned to the superconducting cable side, it is possible to prevent the excess length of the optical fiber from hindering the connection work, and also it is possible to reduce the occurrence of accident such as a damage of the optical fiber, or the like.

DESCRIPTION OF REFERENCED NUMERALS 10, 10A, 10B optical fiber; 11, 11A, 11B, 12 optical fiber excess length; 20 tubular member; 30 spliced part; 100, 100A, 100B superconducting cable; 101 cable core; 102 thermal insulation pipe; 102$a$ inner pipe; 102$b$ outer pipe; 110 former; 111 superconductive conductor; 112 electrical insulation layer; 113 outer superconductive layer; 114 protective layer; 115 reinforcement electrical insulation layer; 120 joint box; 120$a$ coolant vessel; 120$b$ vacuum vessel; 200 pulling cap; 300 fixing jig; 301 perpendicular fragmentary part; 302 horizontal fragmentary part; 303 notch; 400 fusion splicer

BEST MODE FOR CARRYING OUT THE INVENTION

Figure 1A:
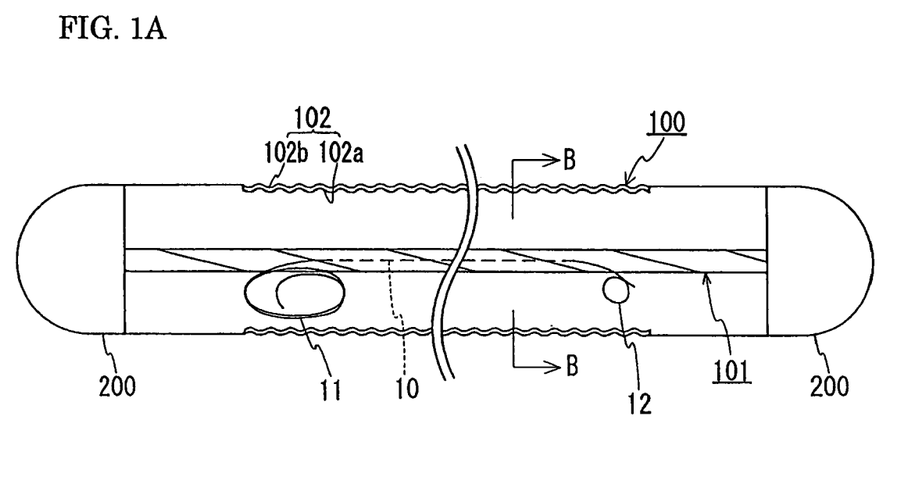
FIG. 1A is a schematic diagram illustrating the structure of a superconducting cable in a state prior to installation.
Figure 1B:
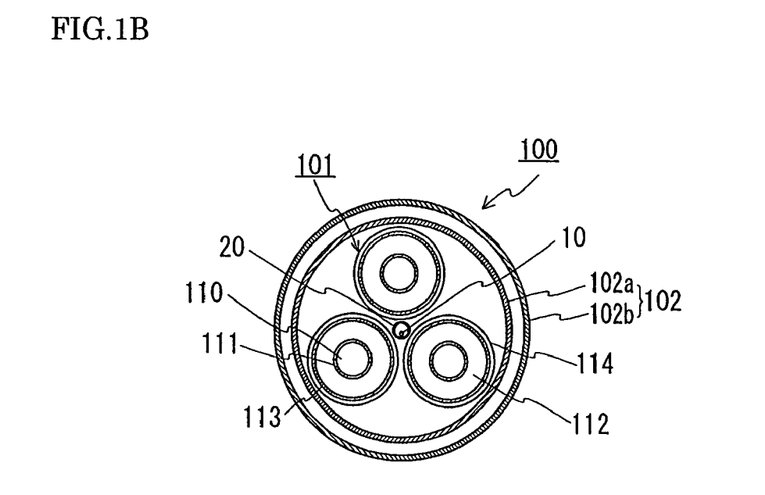
FIG. 1B is B-B sectional view of FIG. 1A.
Figure 2:
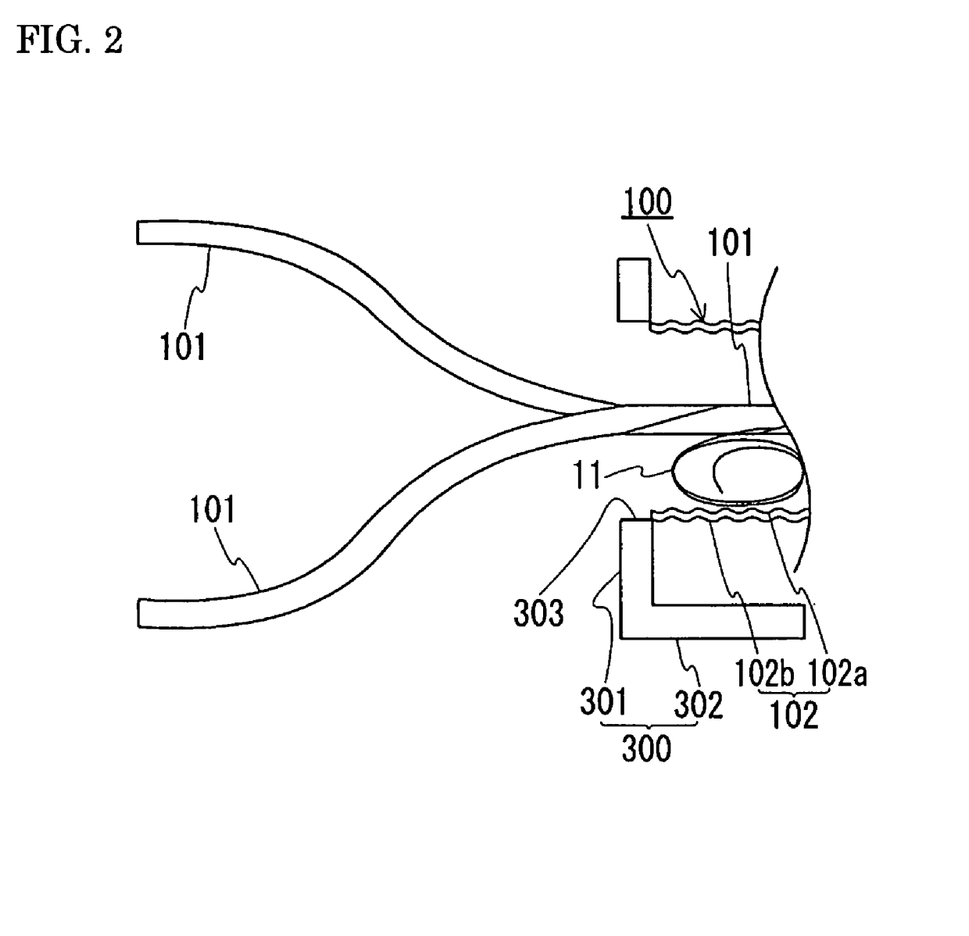
FIG. 2, which is a diagram for explaining the construction procedure of a normal joint structure of a superconducting cable, illustrates a state in which cable cores are exposed from an end of the superconducting cable, the cable cores being untwisted.
Figure 3:
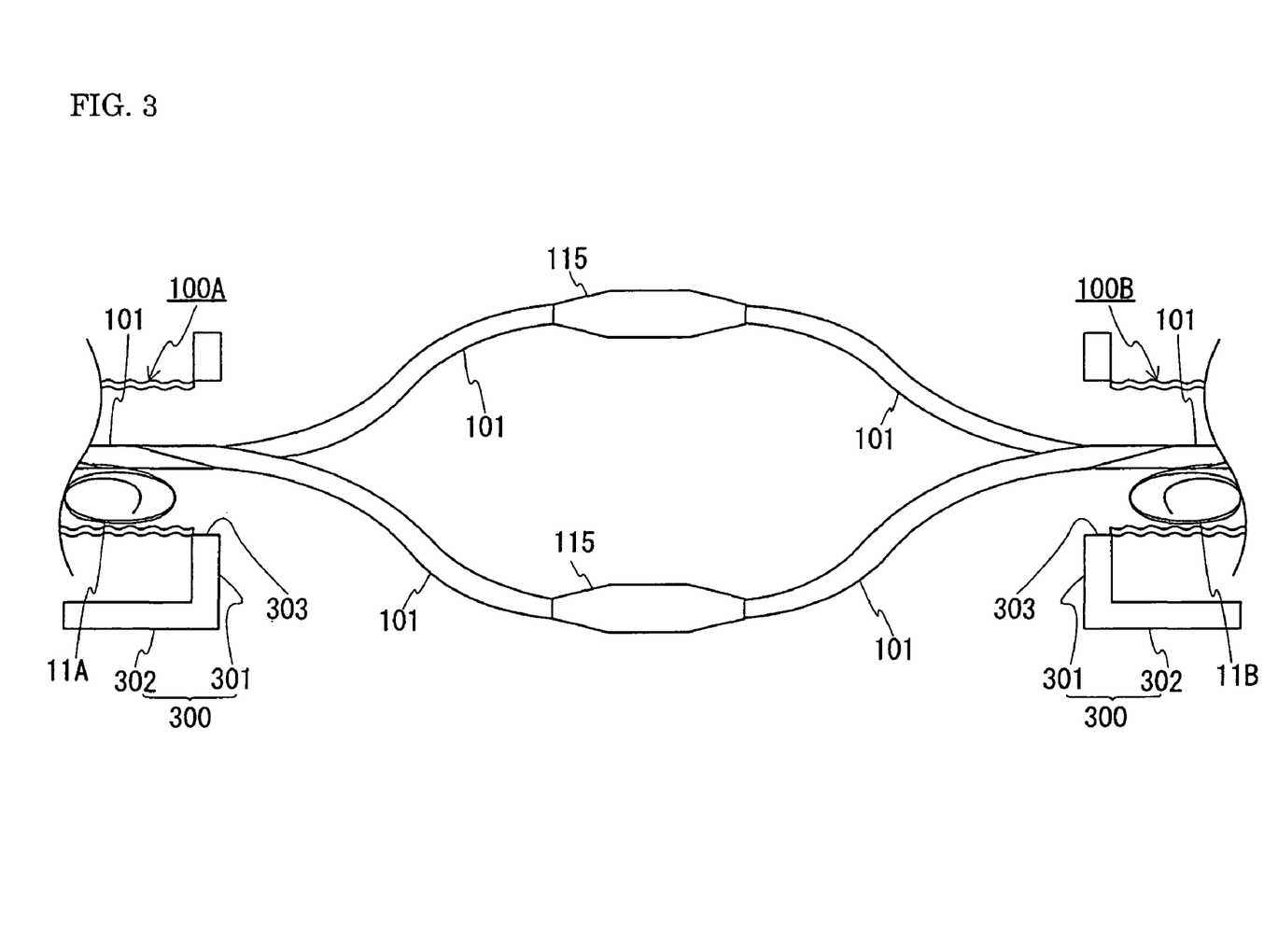
FIG. 3, which is a diagram for explaining the construction procedure of a normal joint structure of a superconducting cable, illustrates a state in which a coupled part of the cable cores is formed.
Figure 4:
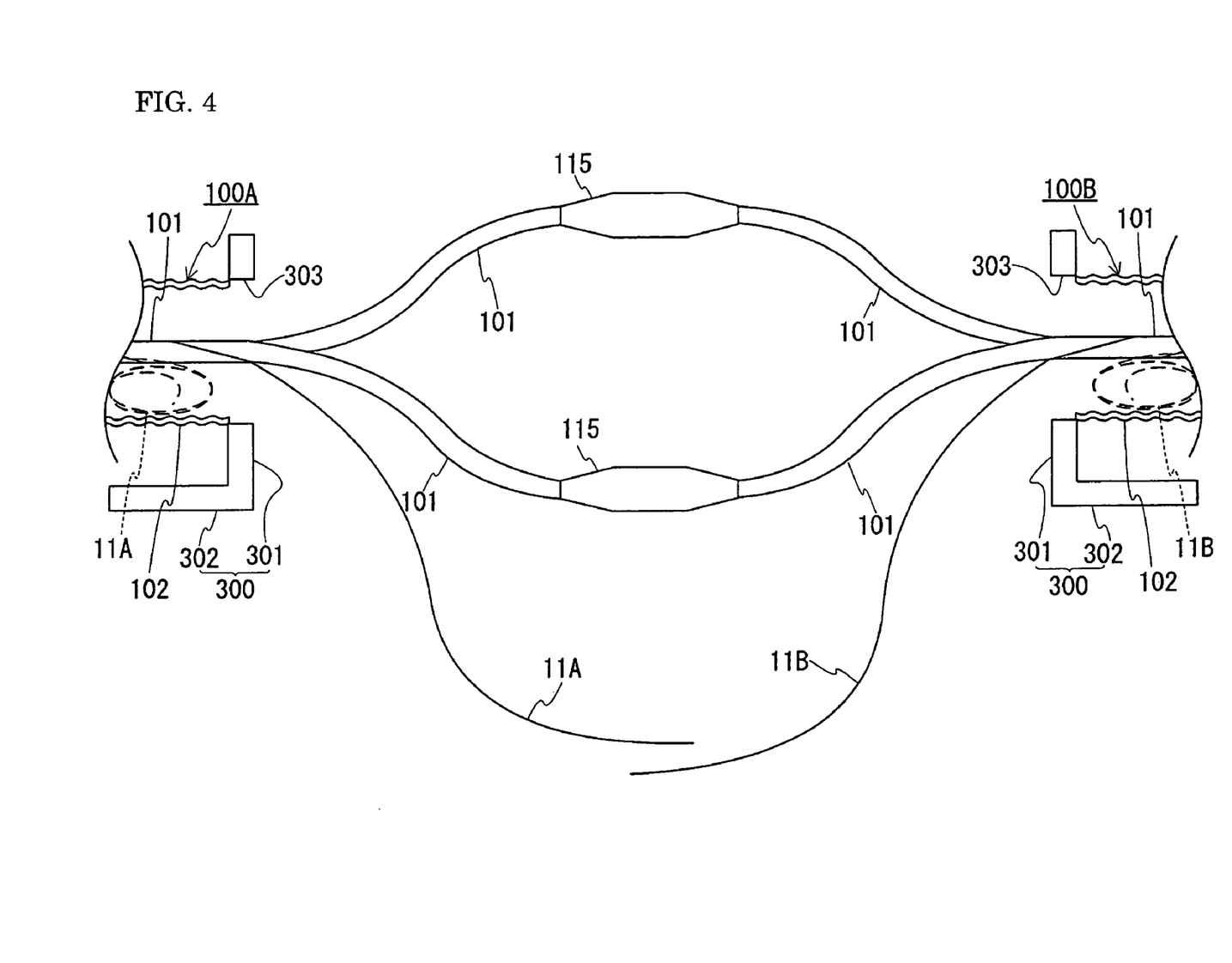
FIG. 4, which is a diagram for explaining the construction procedure of a normal joint structure of a superconducting cable, illustrates a state in which optical fiber excess lengths are pulled out.
Figure 5:
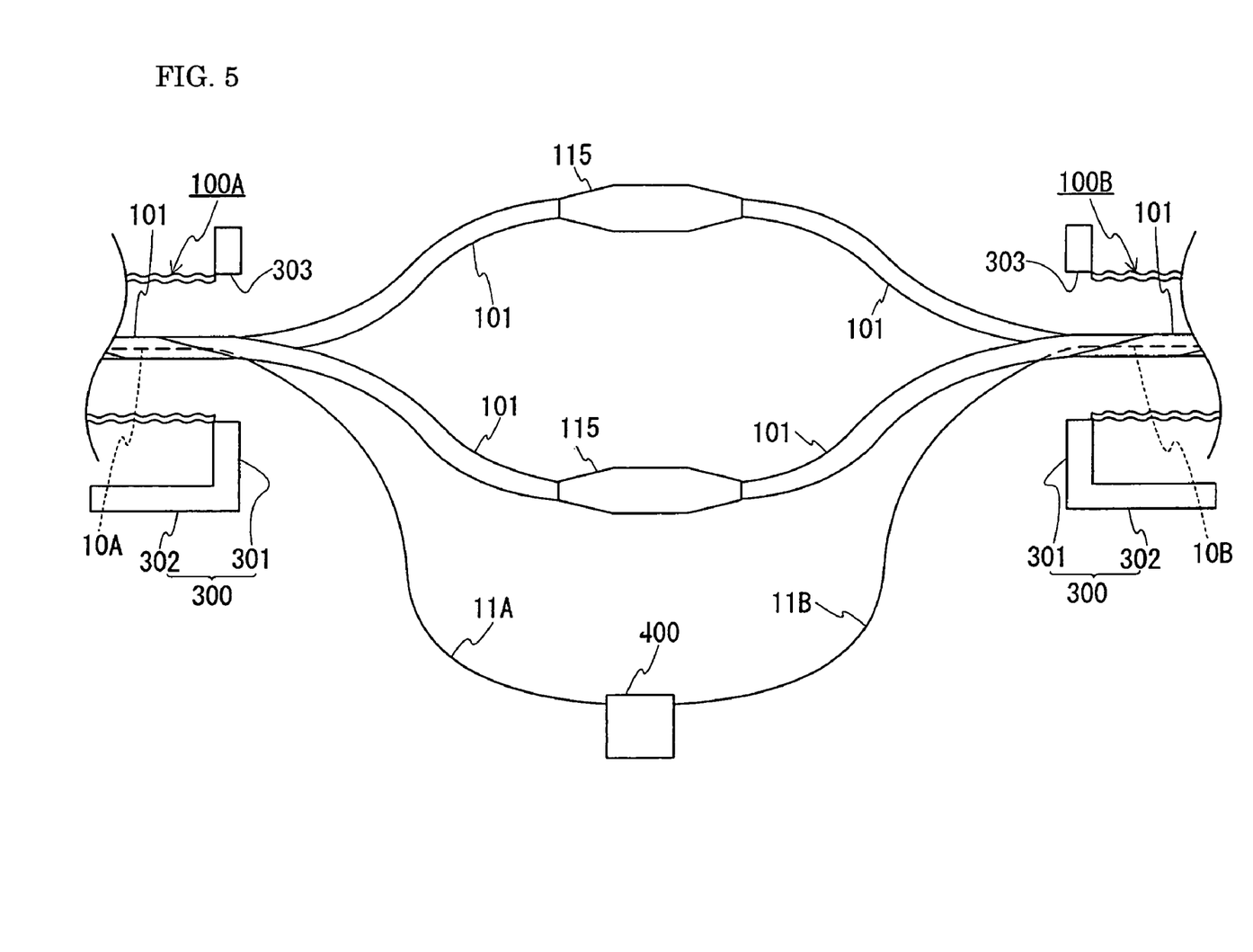
FIG. 5, which is a diagram for explaining the construction procedure of a normal joint structure of a superconducting cable, illustrates a state in which the ends of optical fibers are being spliced with a fusion splicer.
Figure 6:
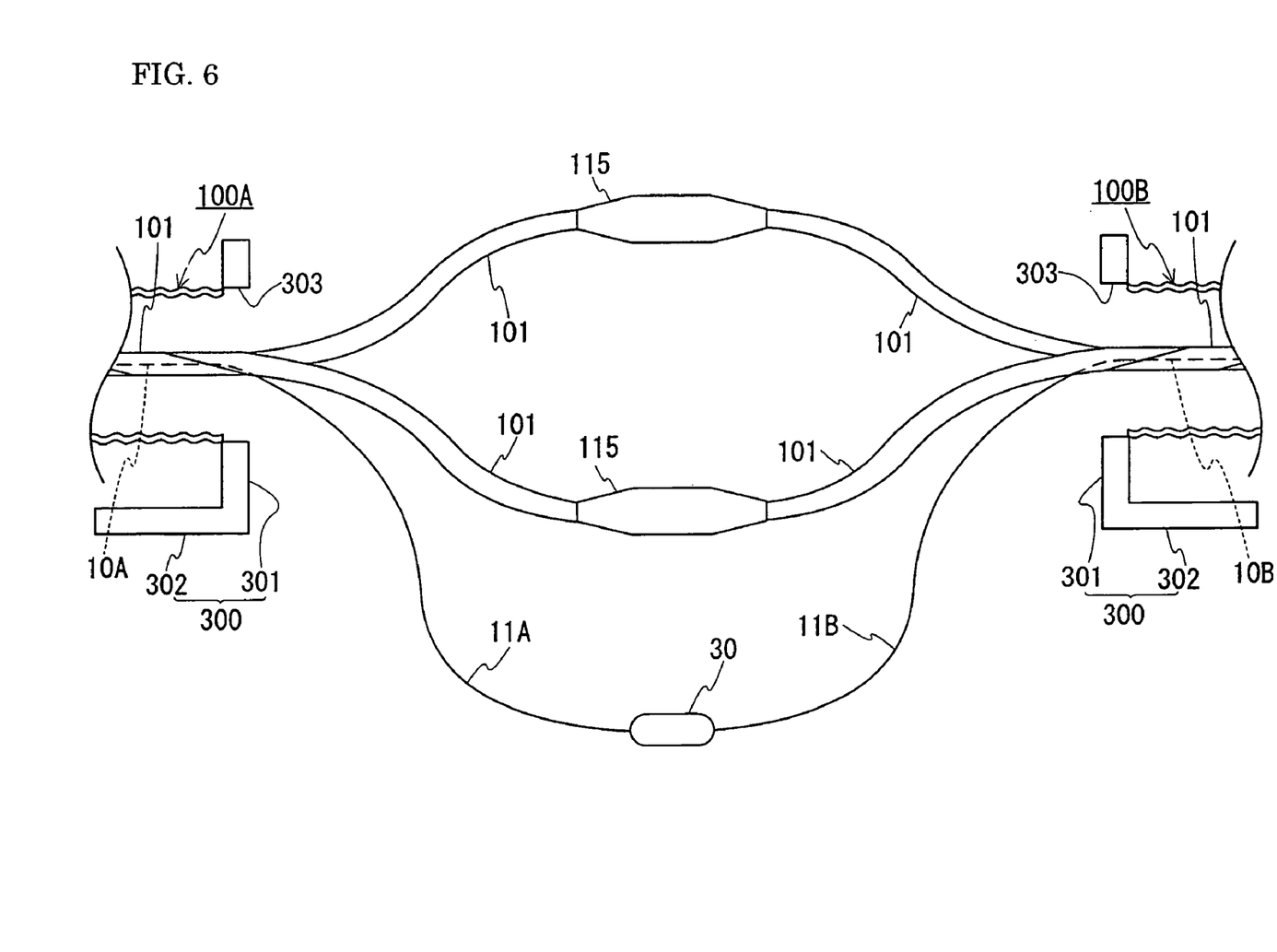
FIG. 6, which is a diagram for explaining the construction procedure of a normal joint structure of a superconducting cable, illustrates a state in which a spliced part of optical fibers is formed.
Figure 7:
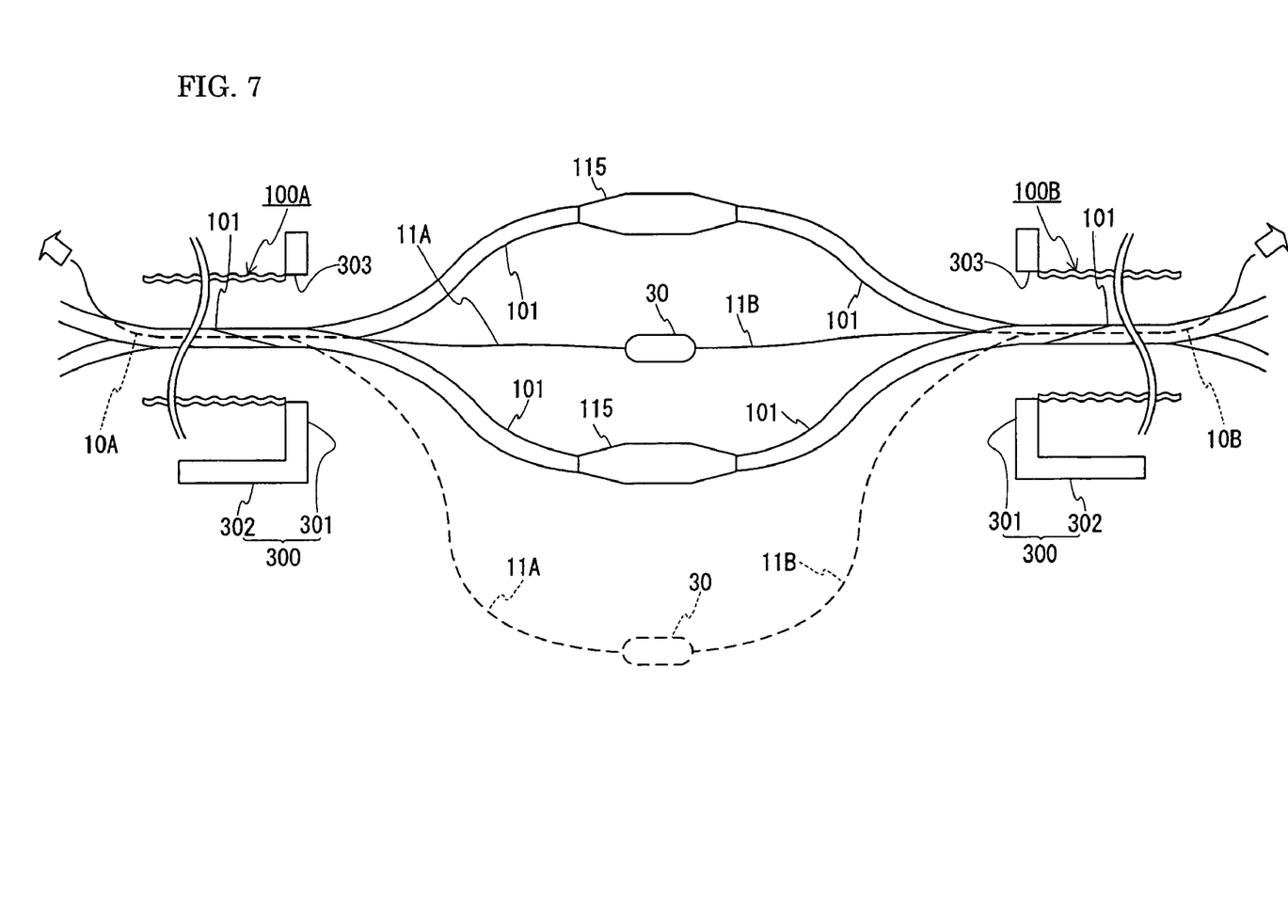
FIG. 7, which is a diagram for explaining the construction procedure of a normal joint structure of a superconducting cable, illustrates a state in which optical fibers are pulled to the respective superconducting cable sides.
Figure 8:
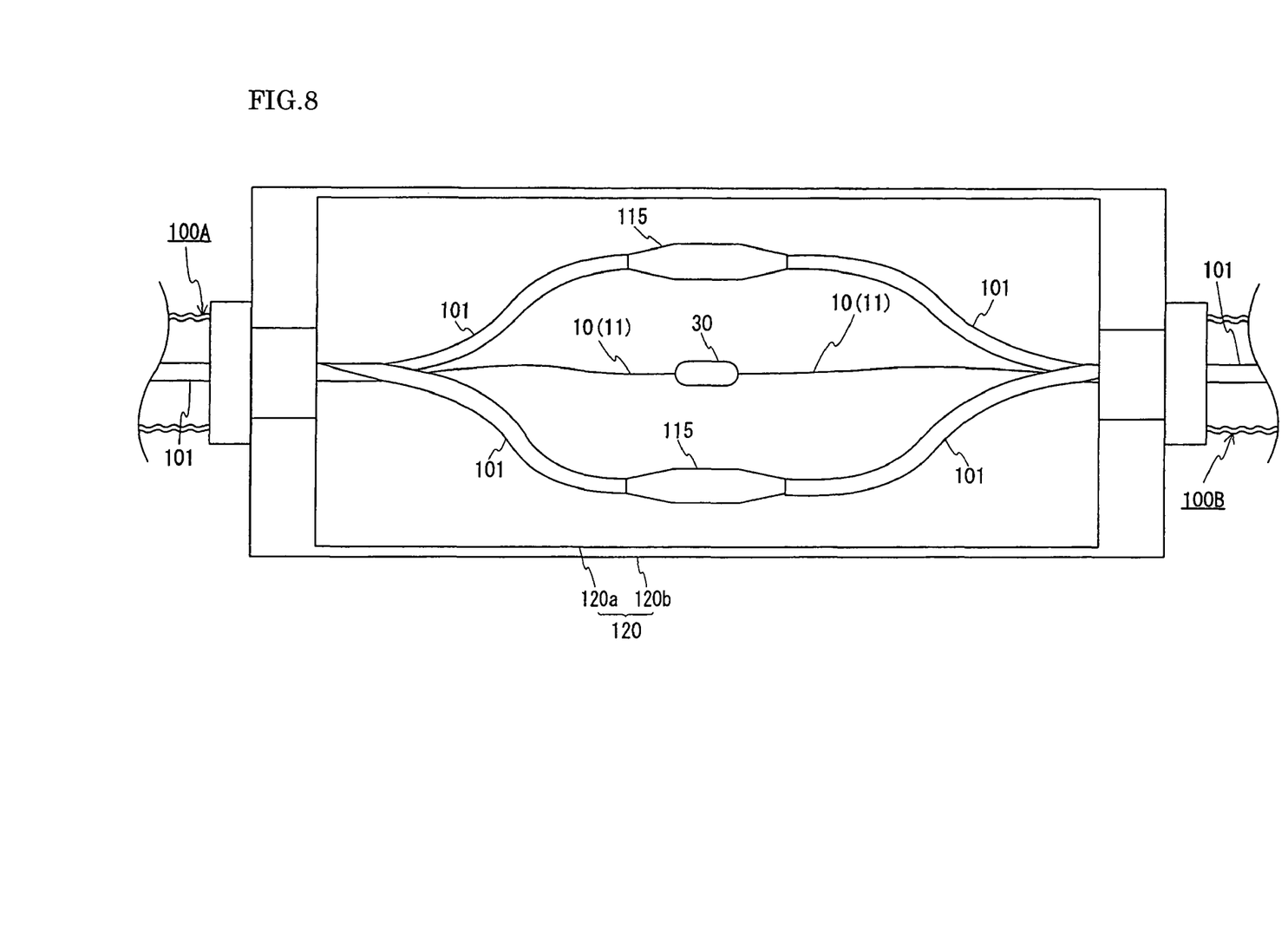
FIG. 8, which is a diagram for explaining the construction procedure of a normal joint structure of a superconducting cable, illustrates a state in which the coupled parts of the cable cores and the spliced part of optical fibers are stored in a joint box.

Hereinafter, preferred embodiments of the invention will be described. In the drawings, the identical marks show the same items. The ratio of dimensions in the drawings does not always agree with those of the description. FIG. 1A is a schematic diagram illustrating the structure of a superconducting cable in a state prior to installation, and FIG. 1B shows B-B sectional view of FIG. 1A. FIGS. 2 to 8 are diagrams for explaining the construction procedure of a normal joint structure for a superconducting cable. FIG. 2 illustrates a state in which cable cores are exposed from an end of the superconducting cable. FIG. 3 illustrates a state in which coupled parts of the cable cores are formed. FIG. 4 illustrates a state in which optical fiber excess lengths are pulled out, and FIG. 5 illustrates a state in which the ends of optical fibers are being spliced with a fusion splicer. FIG. 6 illustrates a state in which a spliced part of optical fibers is formed, and FIG. 7 illustrates a state in which the optical fibers are pulled to the respective superconducting cable sides. FIG. 8 illustrates a state in which the coupled parts of the cable cores and the spliced part of the optical fibers are stored in a joint box. Although, the drawings of FIGS. 2 to 8 illustrate only two cable cores equipped in the superconducting cable, actually, three cable cores exist.

The present invention relates to the method of constructing a normal joint structure of a superconducting cable. First, a superconducting cable is explained. The superconducting cable 100 shown in FIG. 1A and FIG. 1B is a three-core cable having three cable cores 101 which are twisted together and housed in a thermal insulation pipe 102. The cable core 101 includes a former 110, a superconductive conductor 111, an electrical insulation layer 112, an outer superconductive layer 113, and a protective layer 114 in the enumerated order from the center. The former 110 used in this case is made of stranded copper wires covered with an insulating material. The superconductive conductor 111 and the outer superconductive layer 113 were formed by winding a Bi2223 based superconductive tape-shaped wire (Ag—Mn sheathed wire) spirally in multiple layers. The electrical insulation layer 112 was formed by winding semisynthetic insulating paper (PPLP from Sumitomo Electric Industries, Ltd.: registered trademark). The protective layer 114 was formed by winding kraft paper. A semiconductive layer may be provided on the internal circumference side of the electrical insulation layer and the outer periphery side of the electrical insulation layer, respectively. Three lengths of cable cores 101 having such composition were prepared, and these cores 101 were twisted in a flexed manner so as to have an allowance for thermal shrinkage.

The thermal insulation pipe 102 is a dual structure pipe consisting of an inner pipe 102$a$ and an outer pipe 102$b$, which are both made of a corrugated stainless steel, and as shown in FIG. 1A the outer pipe 102$b$ is designed to be longer than the inner pipe 102$a$ (the extension part is made of a flat pipe). The interval between the inner pipe 102$a$ and the outer pipe 102$b$ is sealed at the end of the inner pipe 102$a$, and the sealed space between the pipes 102$a$ and 102$b$ is evacuated. A thermal insulation material may be arranged in multiple layers between the pipes 102$a$ and 102$b$. A coolant such as liquid-nitrogen or the like is filled in the inner pipe 102$a$ during the line operation, and the space defined by the internal surface of the inner pipe 102$a$ and the circumferential surfaces of the cable cores 101 is used as a coolant circulation channel. The outer periphery of the thermal insulation pipe 102 is provided with an anticorrosion layer (not illustrated) consisting of polyvinyl chloride.

An optical fiber 10 is arranged in the gap provided at the central part among the above-mentioned twisted cable cores 101. The optical fiber 10 used in this example was structured such that a thin pipe made of stainless steel is provided around the outer periphery of an optical fiber core wire, the core wire and the stainless pipe being integrated with a resin filled between them. In this example, the optical fiber 10 is housed in a tubular member 20 which is arranged in the gap among the above cores 101 (Refer to FIG. 1B; it is omitted in FIG. 1A). The tubular member 20 is a corrugated pipe consisting of stainless steel and has a plurality of through holes piercing from outside to inside. With this structure, the coolant filled in the thermal insulation pipe 102 (the inner pipe 102$a$) flows into the tubular member 20 through the above through holes, filling inside the tubular member 20 so that the optical fiber 10 can touch the filled coolant. In FIG. 1B, the space inside the tubular member 20 is illustrated in an exaggerated size, and the size of the tubular member 20 may be determined appropriately so that the optical fiber 10 can be inserted and arranged therein. The tubular member 20 was inserted so as to be arranged in the gap among the above cores 101 which have been twisted together, and thereafter the optical fiber 10 was inserted and arranged in the tubular member 20. In this manner, the optical fiber 10 is inserted and arranged in the tubular member 20 which is longitudinally arranged along the cable cores 101, and hence the optical fiber 10 is arranged longitudinally along the cores 101. The tubular member 20 in which the optical fiber 10 is inserted and arranged beforehand may be arranged in the gap among the cable cores 101.

The excess lengths 11 and 12 (to be used when optical fibers 10 are spliced together) of the optical fibers 10 are arranged at the respective ends (ends of a superconducting cable) of a cable core 101. In this example, the excess lengths 11 and 12 of the optical fibers 10 are stored in a form coiled within an allowable bend radius range in a thermal insulation pipe 102 (inner pipe 102a). The excess length 11 arranged at one end of the cable core 101 (the left side in FIG. 1A) includes a splice excess length needed for splicing the optical fibers and a pull-out excess length needed for arranging the end of the optical fiber 10 at the work position when the splice structure of the optical fibers is to be formed. The excess length 12 arranged at the other end (the right side in FIG. 1A) includes a splice excess length but does not include a pull-out excess length. These excess lengths 11 and 12 are in an exposed state, without being stores in the tubular member 20.

The superconducting cable 100 having the above compositions is equipped with pulling caps 200 at both ends and wound on a drum, for example, and is transported in that state to an installation site. Thus, the superconducting cable 100 is towed by means of the pulling cap 200 and installed at a predetermined installation position. During the transportation and the installation work, the thermal insulation pipe 102 of the superconducting cable 100 is left in a state of not being filled with a coolant.

Next, an explanation will be given with respect to the construction procedure of a normal joint structure formed at the end of the superconducting cable 100 thus installed.

I. The Exposure of a Cable Core

When superconducting cables 100 have been laid at a predetermined position, first, an end of a thermal insulation pipe 102 in one of the two cables is cut so as to expose a cable core 101. In this example, only the extension part of the outer pipe 102b which extended longer than the inner pipe 102a was cut so that the vacuum of the thermal insulation pipe 102 was not destroyed.

II. The Support of the Thermal Insulation Pipe

Next, as shown in FIG. 2, the end of the thermal insulation pipe 102 is supported with a fixing jig 300. The fixing jig 300 used in this example had a structure with which the end of the thermal insulation pipe 102 could be fixed to the earth and which included a perpendicular fragmentary part 301 having a notch 303 allowing a cable core 101 to be inserted therethrough and a horizontal fragmentary part 302 for supporting the perpendicular fragmentary part 301 to be fixed to the earth. According to the structure of the fixing jig 300 used in this example, mainly the outer pipe 102b of the thermal insulation pipe 102 was supported by it and the opening of the inner pipe 102a could be observed fully through the notch 303.

III. The Connection of Cable Cores

Subsequently, the pulling cap provided at the end of the superconducting cable 100 is removed (see FIG. 1), and thereafter, as shown in FIG. 2, the ends of cores 101 are untwisted and separated from each other to a degree sufficient for forming the coupled part of the cores. Supporting jigs (not illustrated) may appropriately be arranged for maintaining the separation condition. The excess length 11 of the optical fiber may be left to lie in the thermal insulation pipe 102 (inner pipe 102a), or may be pulled out from the thermal insulation pipe 102 and be placed otherwise so as not to hinder formation of a coupled part of the cable cores. If the excess length 11 is pulled out, it may be covered with a cover so as not to be damaged during the work for connecting the cable cores. In this example, it was left as stored in the thermal insulation pipe 102. The above-mentioned work is also performed for the other superconducting cable to be connected. In this example, an explanation will be given for the case in which the other superconducting cable has the same structure as shown in FIG. 1, and in which the superconducting cables were installed in a manner such that the ends on the side where the excess length 11 including the pull-out excess length was provided in the superconducting cables were arranged facing each other.

As shown in FIG. 3, a joint structure is formed between cable cores 101 each pulled out from superconducting cables 100A and 100B respectively. More specifically, the end of each core 101 is peeled off in a step-by-step manner so as to expose a former and a superconductive conductor, and with respect to the cores 101 thus pulled out from the superconducting cables 100A and 100B, connection between the formers as well as connection between the superconductive conductors are achieved respectively, using a connecting sleeve. For example, the formers may be united with a connecting sleeve by compression and the superconductive conductors may be united with a connecting sleeve by soldering. A reinforcement electrical insulation layer 115 is formed by winding a tape-shaped insulation material around the outer periphery of the connecting sleeve. Thus, three coupled parts of cores 101 are formed.

IV. Pulling Out the Excess Length of Optical Fiber

Upon formation of coupled parts of cable cores, the excess lengths 11A and 11B which have been wound in a coil form are released and pulled out from the thermal insulation pipe 102 through the notch 303 of the fixing jig 300 onto the side of the coupled part of cable cores as shown in FIG. 4, so that the work of splicing the optical fibers can be performed.

V. The Splice of Optical Fibers

Thereafter, as shown in FIG. 5, the excess lengths 11A and 11B of optical fibers 10A and 10B which were pulled out respectively from the ends of superconducting cables 100A and 100B which are to be connected together are arranged on a fusion splicer 400. Thus, the optical fibers 10A and 10B are connected. In this manner, a predetermined coupled part 30 is formed as shown in FIG. 6.

VI. Pulling-Back of Optical Fiber Excess Length

Subsequently, the excess length 11A drawn out from the superconducting cable 100A and the excess length 11B drawn out from the superconducting cable 100B are dragged into the cable 100A side and the cable 100B side, respectively by pulling the optical fibers 10A and 10B at the ends not fixed to the fixing jigs 300 as shown in FIG. 7 (hereinafter called "open end": in the figure, left end part for cable 100A, and right end part for cable 100B) in the superconducting cables 100A and 100B respectively. In this example, the other end (the end on the side where the excess length 12 (see FIG. 1) is arranged (i.e., the open end)) of the superconducting cables 100A and 100B is supposed to be open when the splice of the excess length 11A and 11B is performed. By pulling the optical fibers 10A and 10B respectively from the respective open end of the superconducting cables 100 A and 100B, the excess lengths 11A and 11B are respectively returned to the superconducting cable 100 A and 100B sides, and consequently the quantity protruding from the ends of the cables 100A and 100B is reduced as shown in FIG. 7. Particularly, in this example, it is possible to perform the pulling-back operation easily without causing an optical fiber breakage or the like since the optical fibers 10A and 10B are stored in a tubular member, thereby the friction of pull-in being reduced. The optical fiber drawn out to the open end side can be used as a pull-out excess length when the spliced part of optical fibers is formed on the open end side.

VII. The Construction of a Joint Box

Then, as shown in FIG. 8, a coolant vessel 120a is formed, which includes the coupled parts of the three cable cores 101 and the spliced part 30 of the optical fiber 10. In this example, the quantity of the excess length 11 of the optical fiber 10 which is housed in the coolant vessel 120a is reduced by pulling the excess length 11 into the superconducting cable side as described above. Consequently, it is unnecessary to enlarge the coolant vessel 120a, and accordingly, the joint box 120 can be small-sized. A vacuum vessel 120b is formed outside the coolant vessel 120a, and the interval between the coolant vessel 120a and the vacuum vessel 120b is evacuated to a predetermined vacuum level. Thus, the joint box 120 is formed. By the formation of the joint box 120, the construction of the normal joint structure is completed.

As described above, according to the construction method of the present invention, the excess length of an optical fiber, which has been pulled out from the end of the superconducting cable when optical fibers are spliced, is pulled back into the superconducting cable side so that amount of the optical fiber which is stored in the joint box can be reduced. Therefore, it is unnecessary to make a large-sized joint box, and accordingly it is possible to make a normal joint structure to have a small outer diameter. In this example, the excess length of each optical fiber drawn out is pulled in from the respective open end of the superconducting cables to be connected together, and therefore, the spliced part of the optical fibers can be arranged to lie near the center of the joint box as in the case of a coupled part of cable cores. Therefore, it is possible to store the spliced part of optical fibers so as to lie substantially at the same position as a coupled part of cable cores in the joint box, and consequently it is easy to perform maintenance and control work.

The structure of the above-mentioned example is such that the excess length of optical fiber is pulled in from the open ends of both of the superconducting cables connected together. However, the excess length of optical fiber may be pulled in only from the open end of one of the superconducting cables. In such case, the spliced part of optical fibers in the joint box is arranged toward a position closer to the side where the pull-in of the optical fiber has been performed. If the superconducting cables connected together do not have an open end (i.e., in the case where the end opposite to the spliced end is not open), for example, in the case where a joint box is already formed at the opposite end, an optical fiber may be returned to the superconducting cable side by being pushed into a tubular member. In such case, a tubular member having a size (caliber) sufficiently large for housing the excess length may be used. If the structure is such that an optical fiber by itself is arranged along the cable core, not being stored in a tubular member, the optical fiber may be pushed into a space existing in the thermal insulation pipe so that the excess length may be arranged therein. When the optical fiber is pushed in, the bend added to the optical fiber should be made within the allowable bend radius. In the case where an optical fiber is simply arranged along the cable cores without using the tubular member, the outer periphery of the optical fiber should preferably be covered with a covering layer made of a high strength material. In the above-described example, an optical fiber has a pull-out excess length; however, an optical fiber having no pull-out excess length may be used if it is possible to pull out the end of the optical fiber so as to lie at the position where a fusion splicer is placed for splicing optical fibers. In such case, it is preferable that the optical fiber be stored in a tubular member so that it can easily be drawn out.

INDUSTRIAL APPLICABILITY

The present invention can be used for making a normal joint structure for connecting superconducting cables together in the case of constructing a superconducting cable line. The superconducting cable line equipped with a normal joint structure made according to the present invention can be used for both the alternating current power transmission and the direct current power transmission.

The invention claimed is:

1. A method of constructing a normal joint structure for connecting superconducting cables each having a cable core, a tubular member arranged along the cable core, and an optical fiber housed in the tubular member and arranged along the cable core, the tubular member being configured to have a structure such that the optical fiber housed therein can be in contact with a coolant that is filled inside the tubular member, the method including the steps of:
    pulling out an optical fiber from the end of each of two superconducting cables to be connected together and splicing the optical fibers thus pulled out;
    returning the excess length of the pulled-out optical fiber to a superconducting cable side by pulling or pushing-in upon the completion of splicing;
    connecting the cable cores; and
    storing the connected cable cores in a joint box formed so as to include a coolant vessel and a vacuum vessel,
    wherein after the joint box is formed, a space located between the coolant vessel and the vacuum vessel is evacuated so that a thermal insulation function is afforded to the vacuum vessel,
    wherein the joint box is equipped with a vacuum layer, and
    wherein a thermal insulation material is arranged between the coolant vessel and the vacuum vessel in addition to the evacuated space.

2. A method of constructing a normal joint structure for a superconducting cable as set forth in claim 1, wherein the pull-out excess length of the optical fiber to be pulled out for splicing is arranged near the ends of the superconducting cables to be connected together.

3. A method of constructing a normal joint structure for a superconducting cable as set forth in claim 1, further comprising the step of:
    utilizing the optical fiber for the measurement of temperature, the detection of accident point of a cable core, or a communication line.

4. A method of constructing a normal joint structure for a superconducting cable as set forth in claim 1, wherein:
    the tubular member is structurally configured such that the optical fiber housed therein can be in contact with the coolant filled inside the tubular member.

* * * * *